(No Model.) 11 Sheets—Sheet 1.
W. F. DURFEE.
MACHINE FOR SEPARATING AND HEADING HORSESHOE NAIL BLANKS.
No. 266,583. Patented Oct. 24, 1882.

WITNESSES. INVENTOR.

(No Model.) 11 Sheets—Sheet 2.

W. F. DURFEE.

MACHINE FOR SEPARATING AND HEADING HORSESHOE NAIL BLANKS.

No. 266,583. Patented Oct. 24, 1882.

WITNESSES.

INVENTOR.
William F. Durfee (No Model.) W. F. DURFEE. 11 Sheets—Sheet 3.
MACHINE FOR SEPARATING AND HEADING HORSESHOE NAIL BLANKS.
No. 266,583. Patented Oct. 24, 1882.

(No Model.)

W. F. DURFEE.

MACHINE FOR SEPARATING AND HEADING HORSESHOE NAIL BLANKS.

No. 266,583. Patented Oct. 24, 1882.

11 Sheets—Sheet 4.

WITNESSES

INVENTOR
William F. Durfee (No Model.)

W. F. DURFEE.

MACHINE FOR SEPARATING AND HEADING HORSESHOE NAIL BLANKS.

No. 266,583. Patented Oct. 24, 1882.

WITNESSES

INVENTOR
William F. Durfee (No Model.)
W. F. DURFEE.
MACHINE FOR SEPARATING AND HEADING HORSESHOE NAIL BLANKS.
No. 266,583. Patented Oct. 24, 1882.
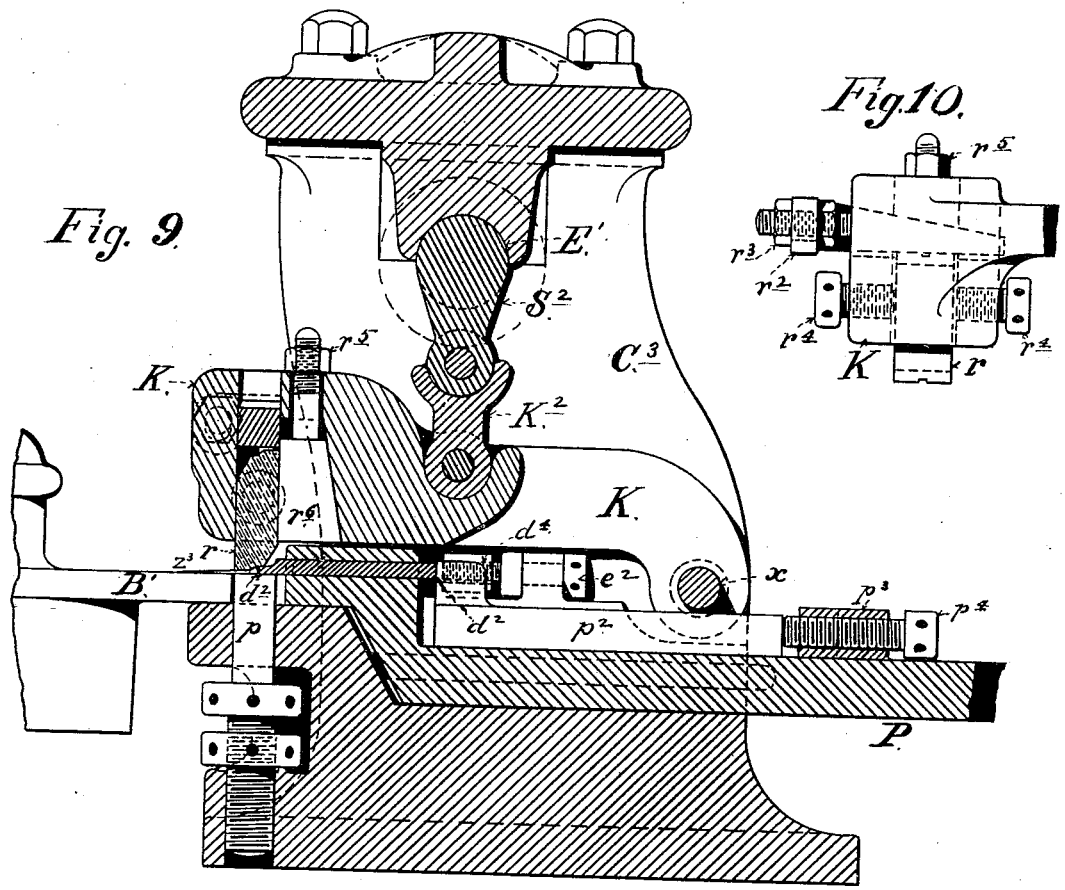
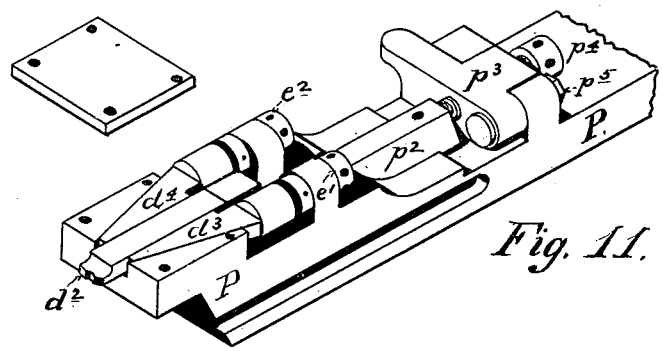
Witnesses
Inventor
William F. Durfee (No Model.) 11 Sheets—Sheet 9.

W. F. DURFEE.
MACHINE FOR SEPARATING AND HEADING HORSESHOE NAIL BLANKS.

No. 266,583. Patented Oct. 24, 1882.

WITNESSES. INVENTOR.

(No Model.) 11 Sheets—Sheet 10.

W. F. DURFEE.
MACHINE FOR SEPARATING AND HEADING HORSESHOE NAIL BLANKS.
No. 266,583. Patented Oct. 24, 1882.

WITNESSES.

INVENTOR.
William F. Durfee (No Model.) 11 Sheets—Sheet 11.

W. F. DURFEE.
MACHINE FOR SEPARATING AND HEADING HORSESHOE NAIL BLANKS.

No. 266,583. Patented Oct. 24, 1882.

WITNESSES.
Isaac Holden
George Terry

INVENTOR.
William F. Durfee

UNITED STATES PATENT OFFICE.

WILLIAM F. DURFEE, OF BRIDGEPORT, CONNECTICUT, ASSIGNOR TO THE WHEELER & WILSON MANUFACTURING COMPANY, OF SAME PLACE.

MACHINE FOR SEPARATING AND HEADING HORSESHOE-NAIL BLANKS.

SPECIFICATION forming part of Letters Patent No. 266,583, dated October 24, 1882.

Application filed March 30, 1882. (No model.)

*To all whom it may concern:*

Be it known that I, WILLIAM F. DURFEE, a citizen of the United States, residing at Bridgeport, in the county of Fairfield and State of Connecticut, have invented certain new and useful improvements in machinery for dividing and subsequently upsetting, stamping, or heading metallic blanks for making horseshoe-nails and similar articles, of which the following is a specification.

For the purpose of more clearly illustrating and describing my invention I have shown it in the accompanying drawings in the form of a machine for performing the several operations named on double-ended blanks (which have previously been shaped and tapered at their extremities) to be used in the manufacture of horseshoe-nails, in which drawings—

Figure 1:
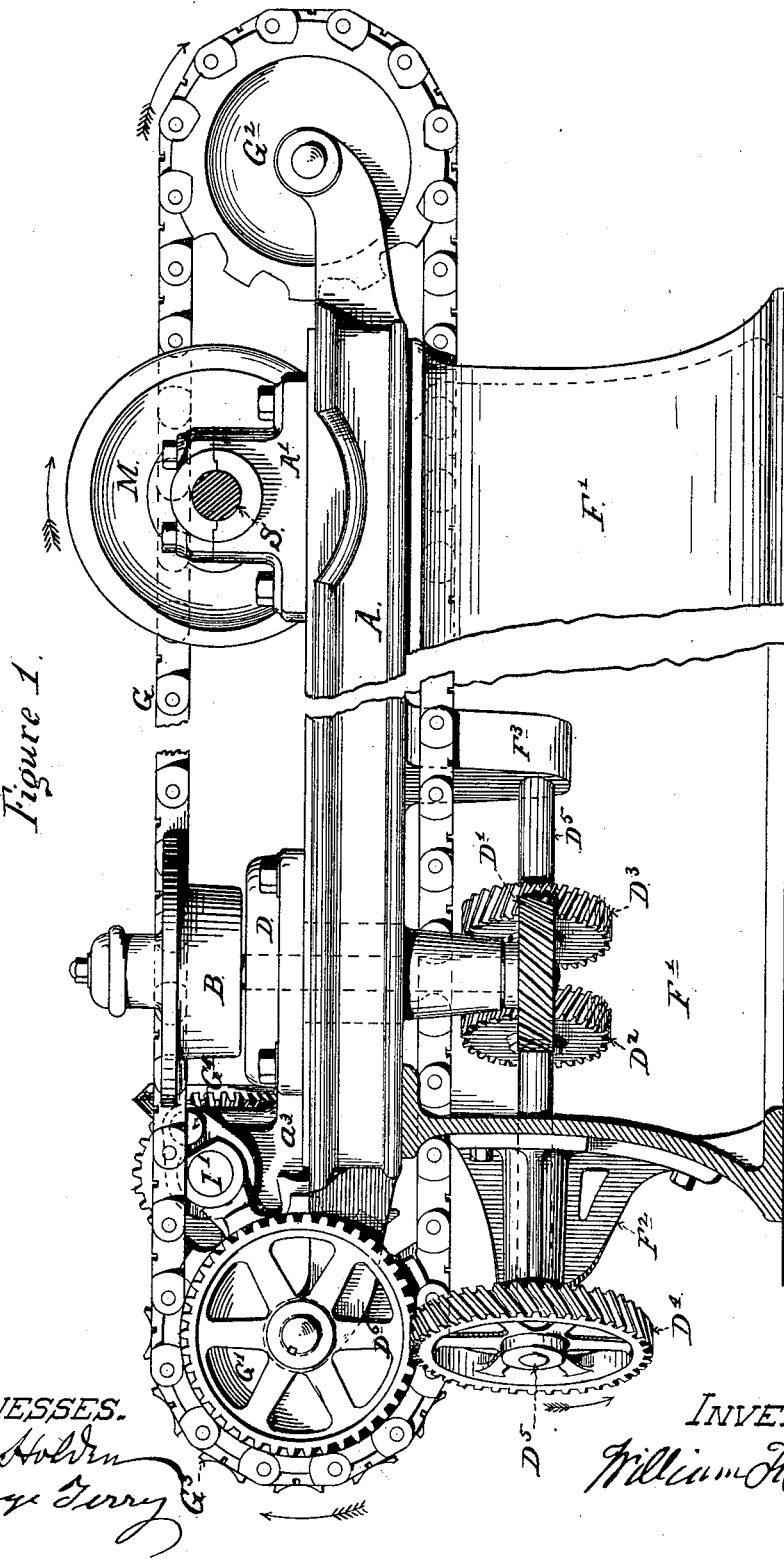
Figure 2:
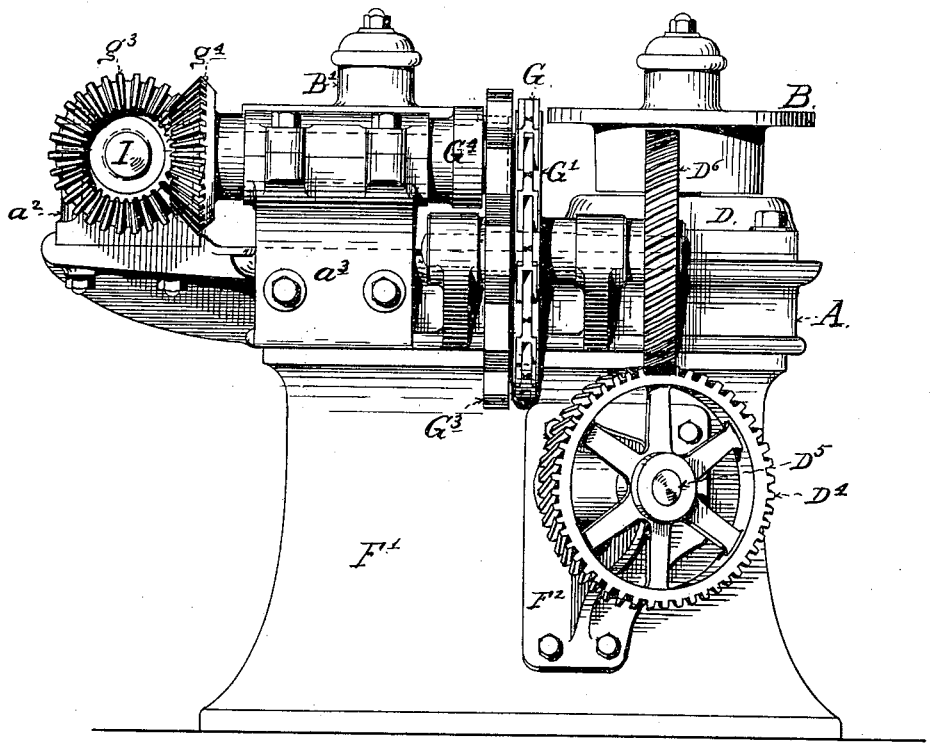
Figure 3:
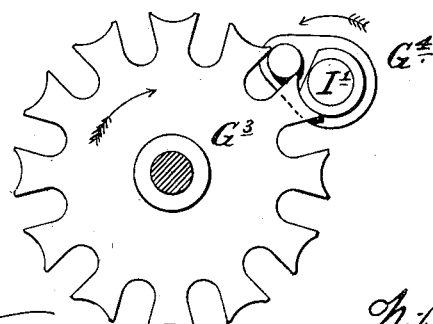
Figure 4:
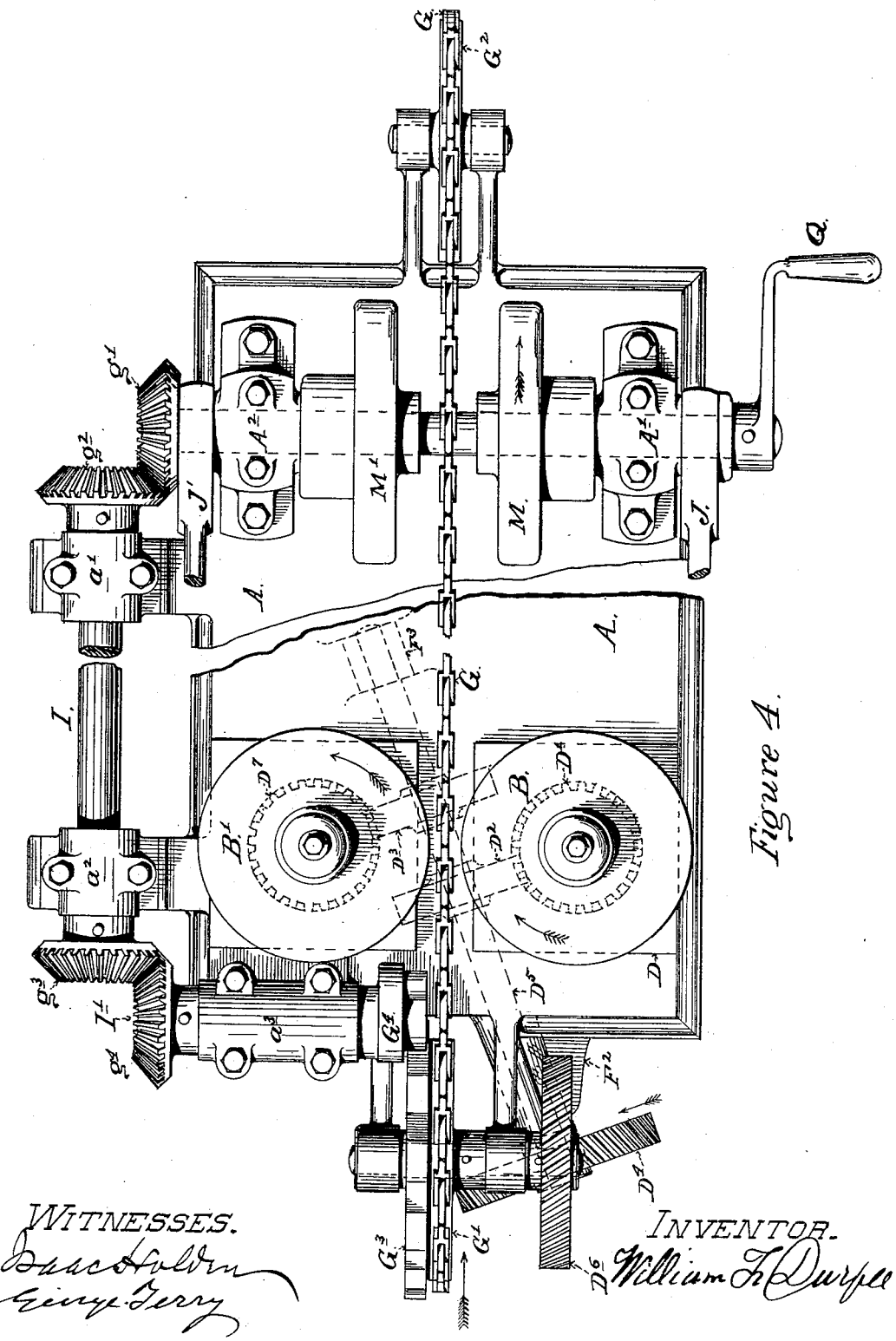
Figure 5:
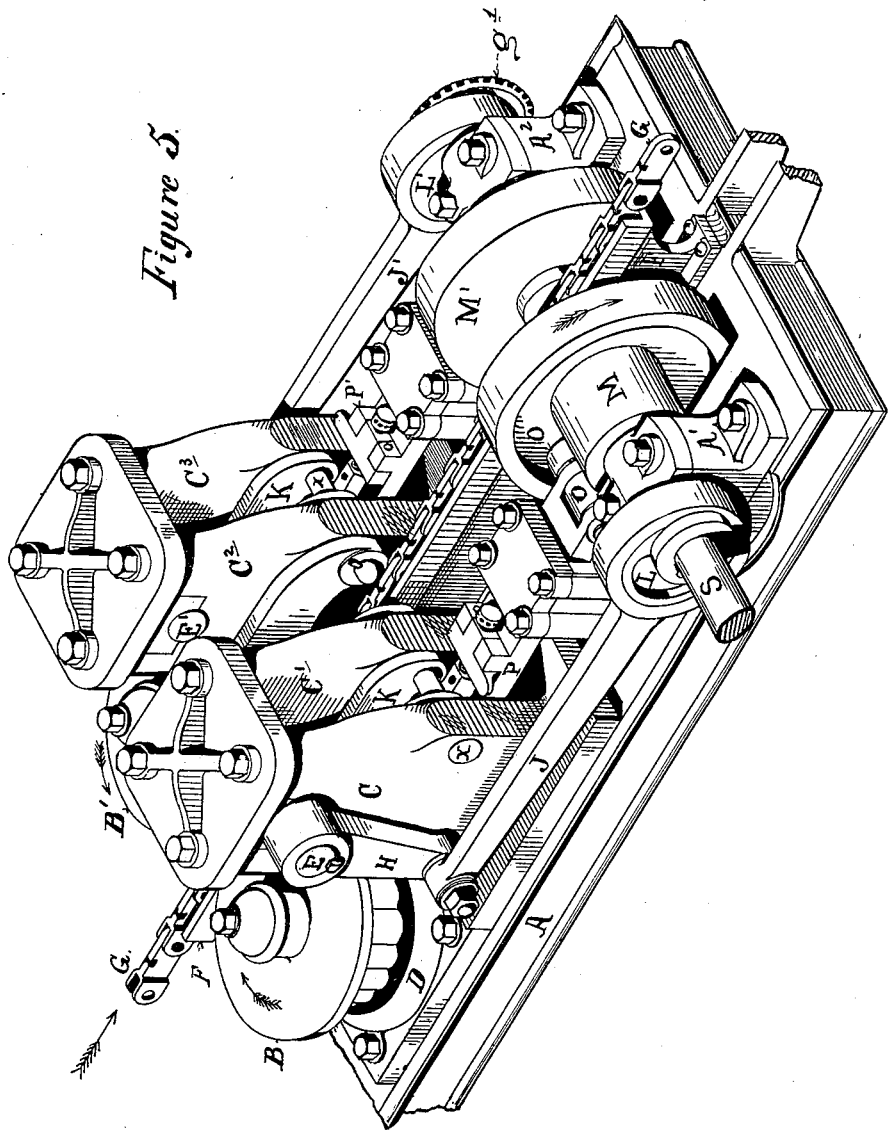
Figure 6:
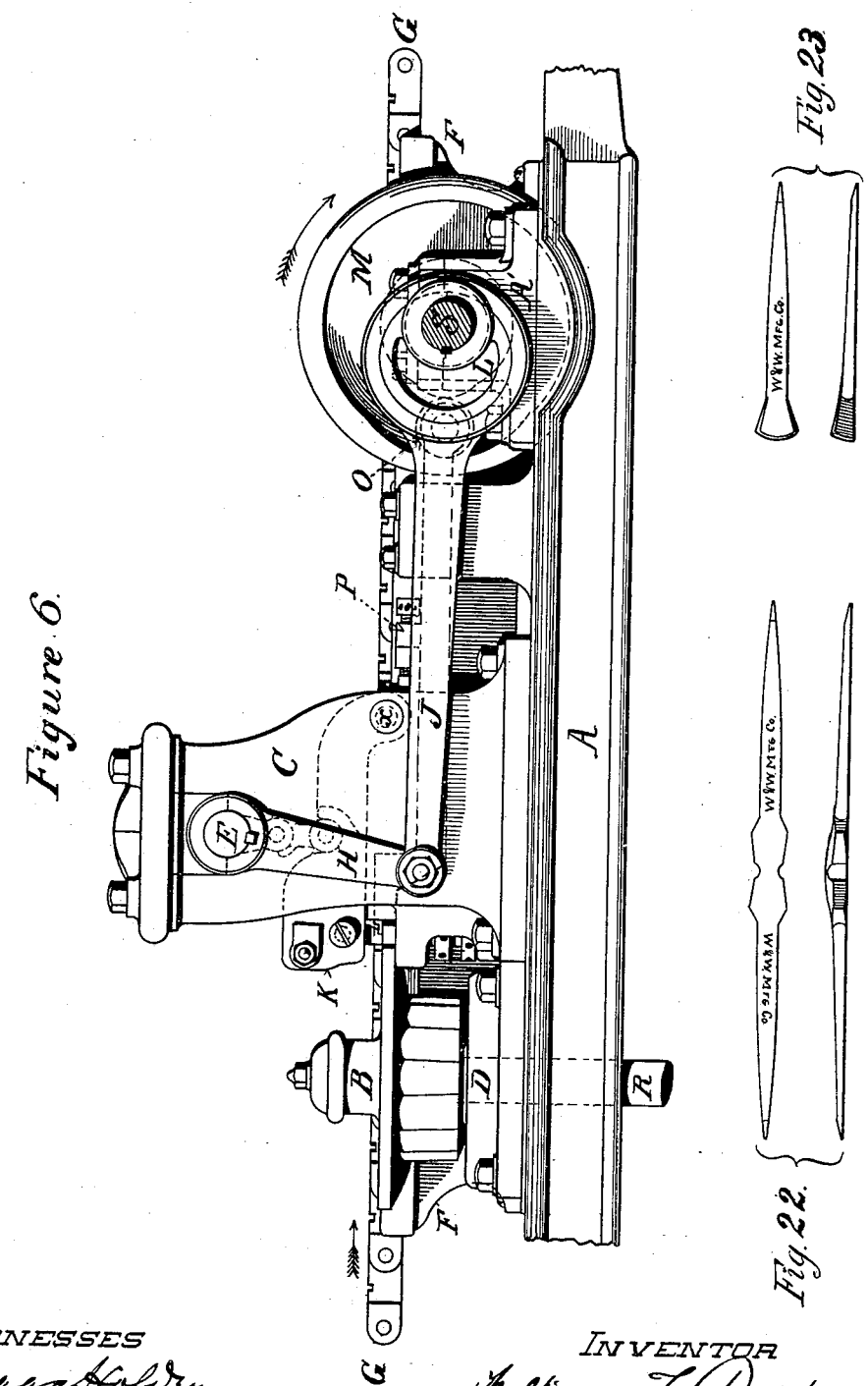
Figure 12:
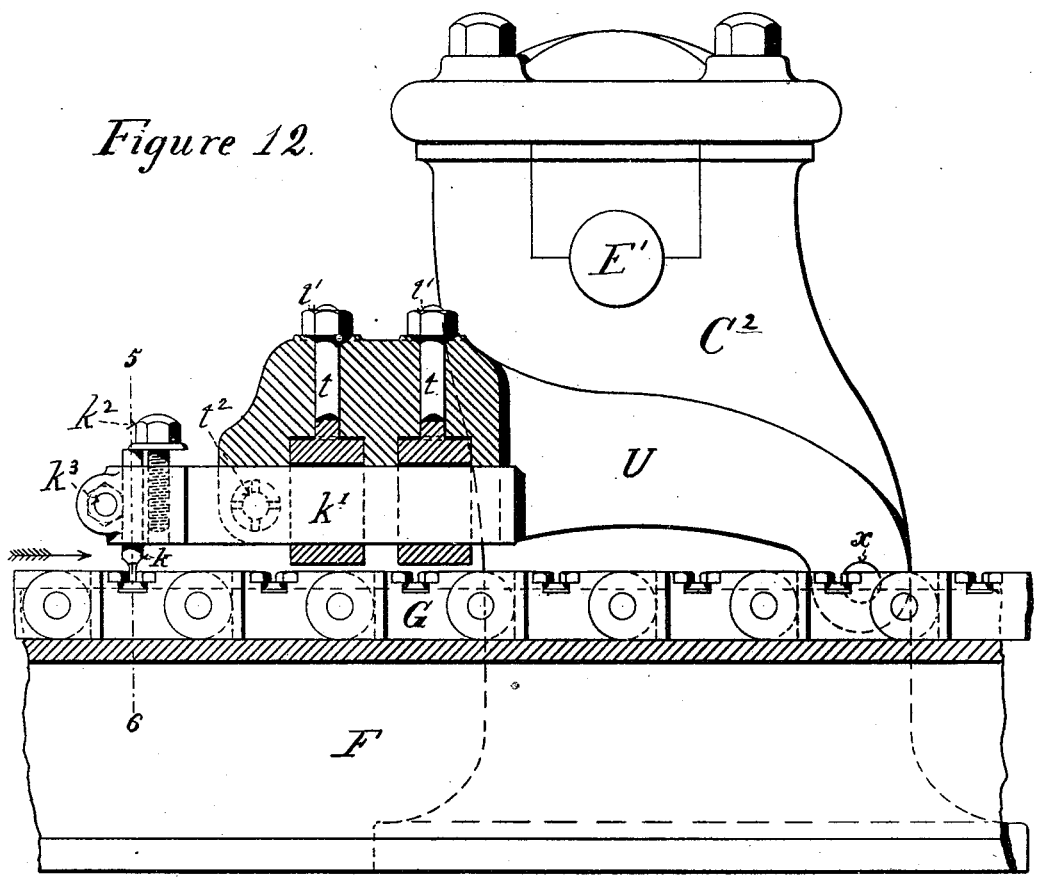
Figures 13, 14, 15:
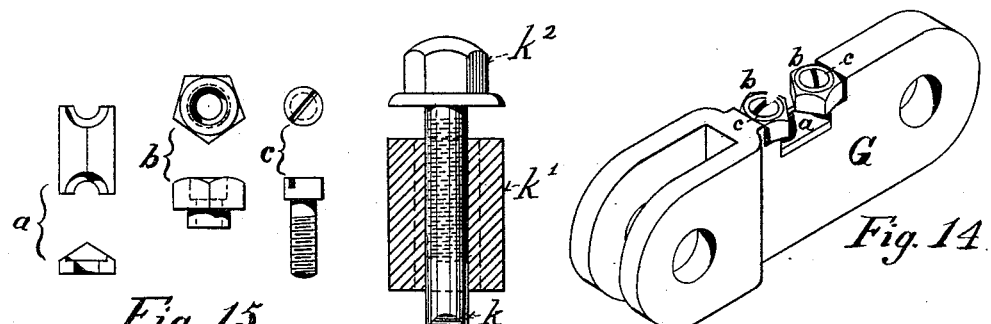
Figure 16:
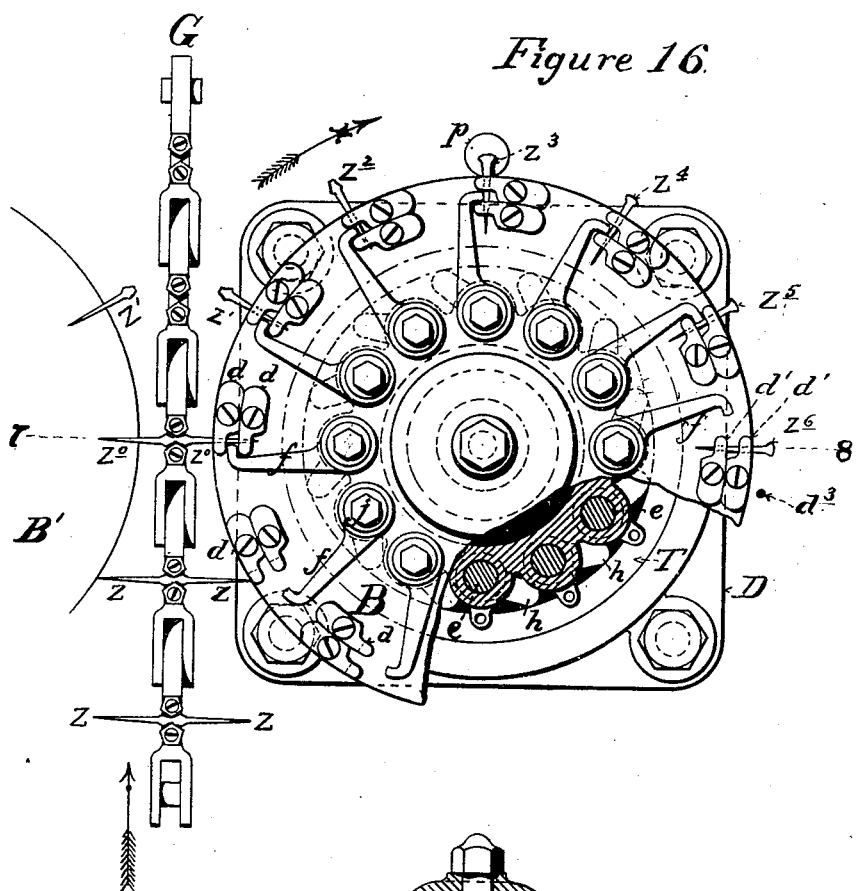
Figure 17:
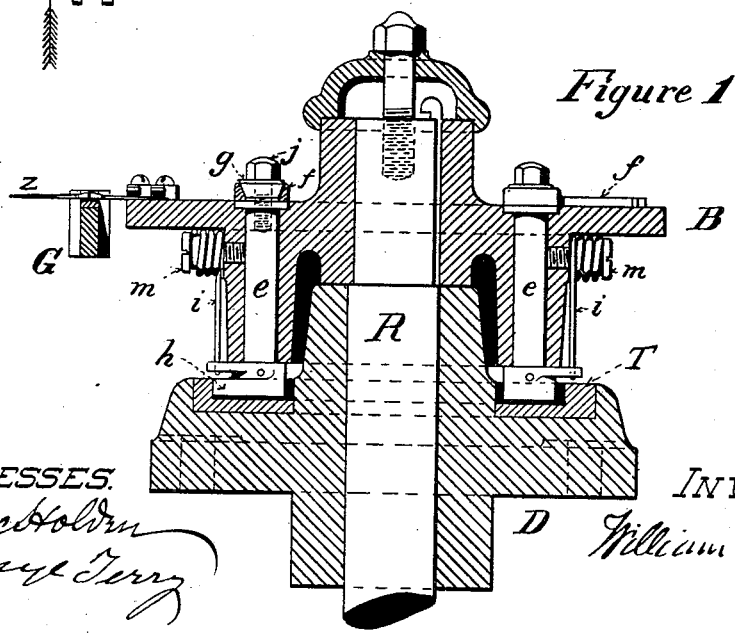
Figure 20:
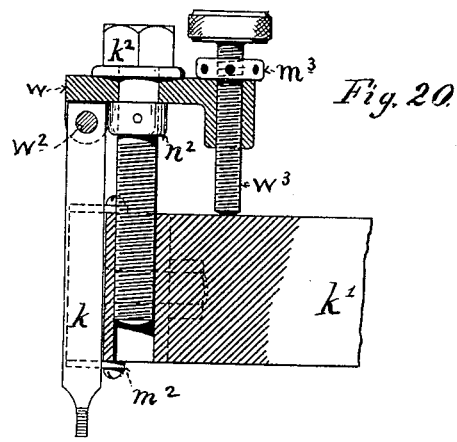
Figure 21:
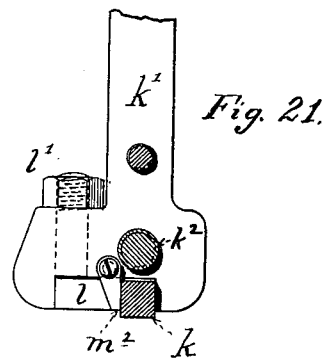
Figure 18:
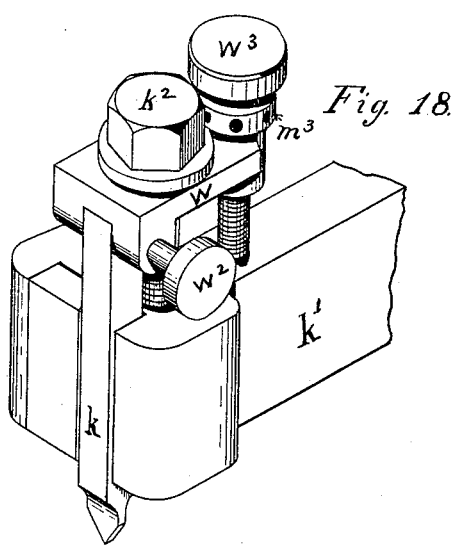
Figure 19:
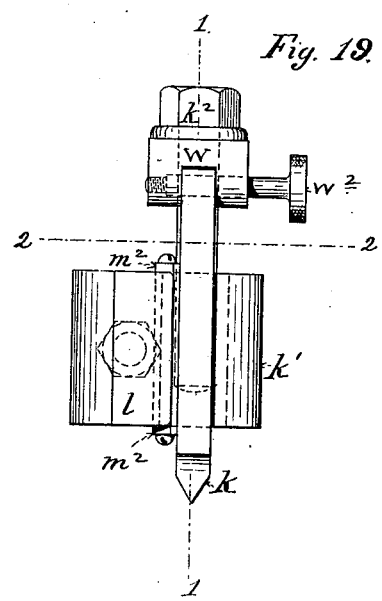

Figure 1 shows a partial side elevation of the frame and supports of the machinery and exhibits the mechanisms which distribute the power to the several parts of the apparatus performing the actual work on the metallic blanks. Fig. 2 is an end elevation of Fig. 1. Fig. 3 shows a diagram of the intermittent motion used to operate the chain and carrying-plates of the machine. Fig. 4 is a plan view of Figs. 1 and 2. Fig. 5 shows an isometrical perspective view of those parts of the machine which perform the several operations upon the metallic blanks, the supporting-frame, chain-wheels, &c., being removed. Fig. 6 is a side elevation of the preceding figure, and Fig. 7 a plan view of the same. Fig. 8 represents, detached and enlarged, a front elevation of the heading-presses, as seen from the left-hand side of Fig. 6, one of said presses being shown in section. Fig. 9 is a vertical section, taken on the line 1 2, Fig. 8, showing also at the left a fragment of the carrying-plate which works in connection with said heading-press. Fig. 10 shows an end elevation of one of the upper die-holders and illustrates the manner of holding and adjusting the dies therein. Fig. 11 represents in perspective that part of the mechanism which carries the upsetting or heading punch, and, in connection with Figs. 8 and 9, shows the manner of adjusting and removing said punch. Fig. 12 is a sectional side elevation of Fig. 8, taken irregularly on the line 3 4 of said figure, and shows distinctly the dividing mechanism; and Fig. 13 is an enlarged cross-section, taken on the line 5 6 of Fig. 12, showing the relative position of the two cutters immediately after a blank has been divided thereby. Fig. 14 represents in perspective one link of the blank-carrying chain, drawn on an enlarged scale for the purpose of showing more distinctly the under cutting-die and other details of construction; and Fig. 15 shows in detail the several parts which are combined to form the receiving-notches in the links of the blank-carrying chain. Fig. 16 is an enlarged plan, partly in section, of one of the plates or mechanisms for holding the blanks while they are being divided and subsequently carrying the same to the stamping or heading dies, and shows the relation of said plates to the blank-carrrying chain aforesaid. Fig. 17 is a sectional elevation of Fig. 16, taken on the line 7 8 of said figure. Fig. 18 is an enlarged perspective view of a modification of the upper cutter and its holder. Fig. 19 shows a front elevation of the same, and Fig. 20 a vertical section of Fig. 19 taken on the line 1 1. Fig. 21 is a horizontal section or plan of Fig. 19 taken on the line 2 2. Fig. 22, Sheet V, shows two views of one of the double-ended blanks pending the action of the herein-described mechanism upon it. Fig. 23 shows two views of a finished nail formed from one-half of the blank, Fig. 22, by the action of the mechanism, herein described.

Similar letters of reference indicate like parts throughout the several views.

A is a horizontal base-plate, supported by the frame F' and carrying the various parts of the machine.

G is the endless blank-conveying chain, and is carried on and operated by the two chain-wheels G' and G², which revolve in bearings attached to the ends of the base-plate A. (See Figs. 1 and 2.)

Figure 7:
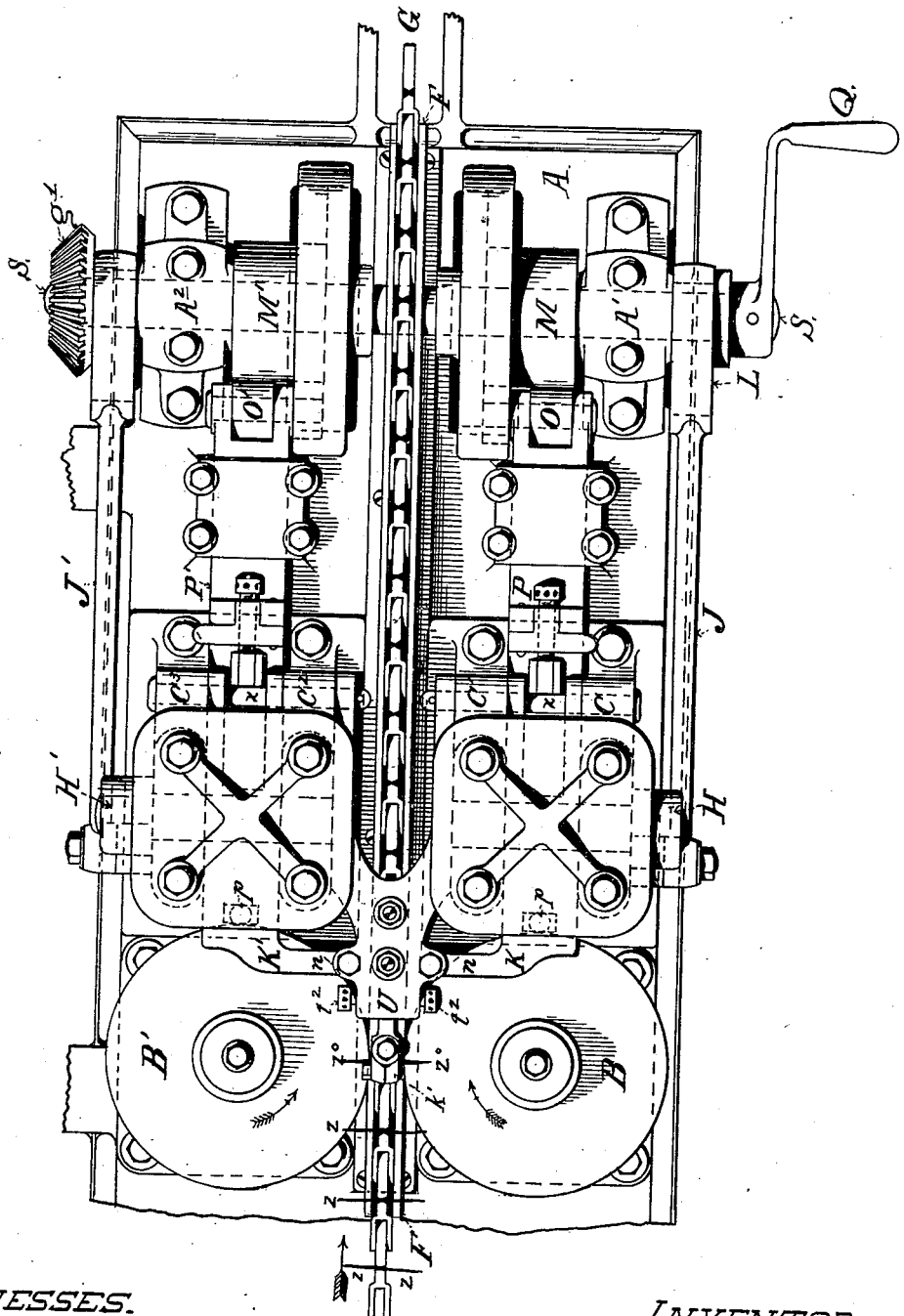
Figure 8:
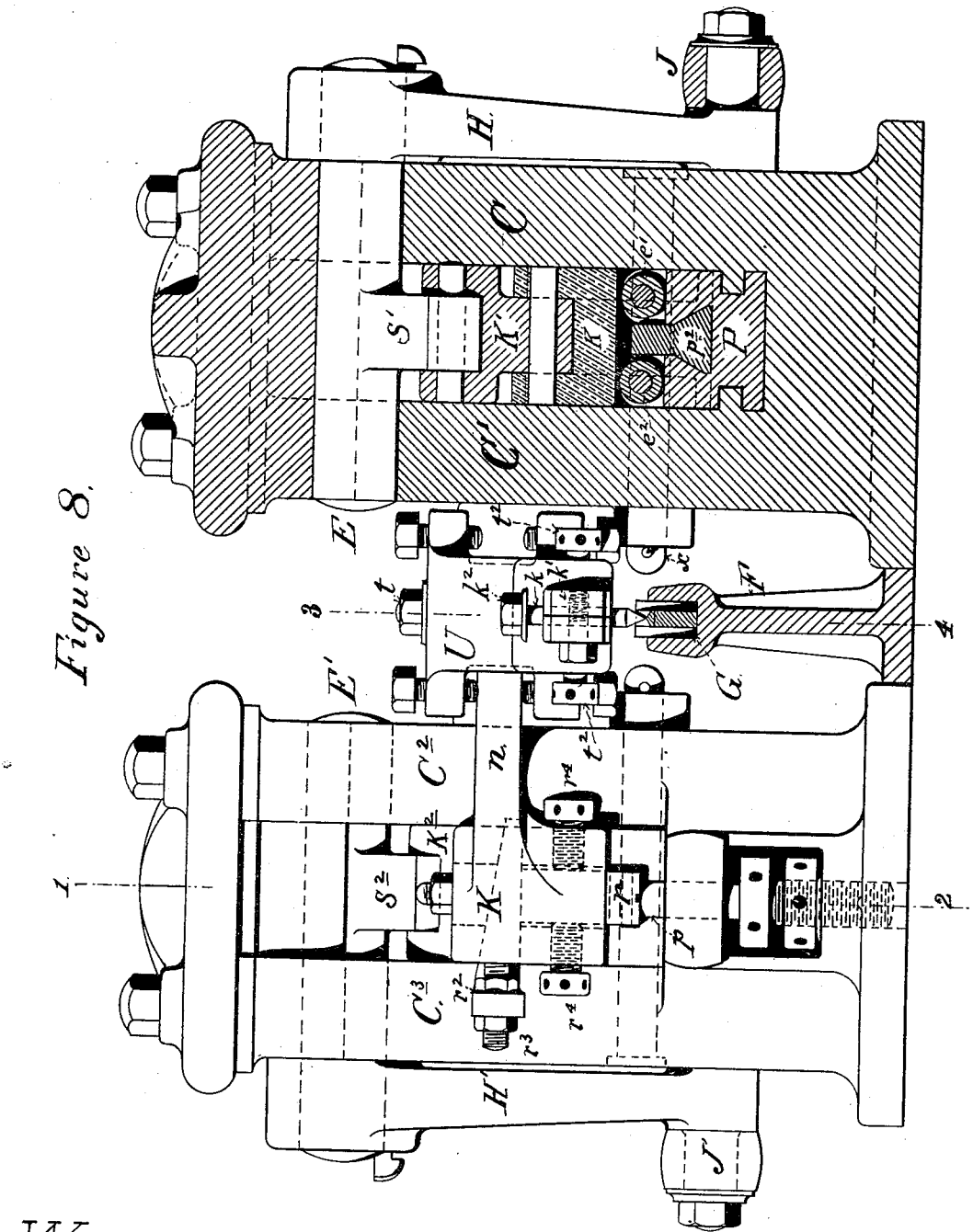

F, Figs. 5, 6, and 7, is a bracket secured along the center of the base-plate A, and has a groove along its upper surface which supports and guides the chain G.

B and B' are the intermittently-rotating carrying disks or plates which convey the divided blanks from the chain to the heading-presses, said carrying-disks being attached to the upper ends of the vertical shafts R, which receive motion through the spirally-toothed wheels D' and D⁷ at their lower extremities, (see Figs. 1 and 4,) in the manner to be hereinafter described.

C C' C² C³ are the upright frames of the heading-presses, and are secured to the base-plate A.

S is the driving-shaft, to which power is applied at Q, (Figs. 4 and 7,) and from which, through the intervention of the miter-gears $g'$ $g^2$, the shaft I, and miter-gears $g^3$ $g^4$, is driven the short crank-shaft I', said shafts S, I, and I' being supported respectively in the bearings A' A², $a'$ $a^2$, and $a^3$, all of which are secured to the base-plate A. (See Figs. 1, 2, and 4.) Attached to one end of the short shaft I' aforesaid is the crank G⁴, so constructed and arranged that in the course of its revolutions its crank-pin engages successively with each of the radial slots formed in the periphery of the star-wheel G³, attached to the chain-wheel G', (see Figs. 1, 2, 3, and 4,) thereby causing the chain G, which is carried on the chain-wheel G', to advance one link in the direction of the arrow at each revolution of the driving-shaft S. Secured to one end of the shaft which supports the wheels G' and G³ aforesaid is the spirally-toothed gear-wheel D⁶, whose teeth engage with those of a similar gear-wheel, D⁴, located directly beneath it, which is carried on the overhanging end of the diagonal shaft D⁵, (shown in Figs. 1, 2, and 4,) said shaft rotating in the bearings F² and F³, attached to the frame-work of the machine, and having secured thereto the small spirally-toothed wheels D² and D³, which engage with the spiral gears D' and D⁷ of the vertical dial-shafts R, before described. By this system of spiral gears the intermittent motions given to the star-wheel G³ are transmitted isochronously to the carrying disks or plates B and B', so that as the chain G aforesaid is advanced through the space of one link in the direction of the arrow the peripheries of the disks aforesaid advance an equivalent distance in the direction of their respective arrows.

The various devices of the heading-presses are actuated directly from the driving shaft S by the eccentrics L L' and cams M M', attached thereto, whose movements will be hereinafter described.

The operation and detail construction of this combined mechanism are substantially as follows: The double-ended blanks $z$ (see Fig. 22) to be operated upon are inserted, either by hand or automatically, into receiving-notches formed in the upper edge of the links of the endless chain G, which is caused to move intermittingly in the direction of the arrow by the action of the mechanism before described. The notches in each of the links aforesaid are constructed substantially as shown in Figs. 13 and 14, wherein $a$ is a removable block of metal, the upper surface of which is formed into a cutting-edge whose function will be hereinafter described. The sides of the notches are formed by the adjacent angles of the two pentagonal blocks of metal $b$ $b$, which rest on the extremities of the cutting-block $a$, and are secured in their places in the chain G by the two slotted headed screws $c$ $c$, which pass through and have their heads counterbored into the pentagonal blocks aforesaid, and also pass through the semicircular notches at the extremities of the cutting-block $a$, thereby performing the double function of securing the pentagonal blocks $b$ $b$ and the cutting-block $a$. By this construction it will be seen that in the event of the adjacent angles of the pentagonal blocks becoming misshapen any other of the angles thereof may be substituted until all of the several angles are unfitted for use, when the blocks may be renewed. After the blanks $z$ have been inserted into the chain-links as aforesaid they are carried forward by the intermittent movements of said chain until their outer extremities overlap the surfaces of the plates B and B' and enter under the projecting fingers of the adjustable blocks $d$ $d$, (see Figs. 16 and 17,) so that the isochronous movement of the chain and plates will cause one of said blanks to finally come into a position in the same vertical plane with a line joining the centers of the two plates, as at $z^0$, at which instant the chain and plates come to a state of rest and the extremity of one of the retaining-arms $f$ on each plate comes in contact with the end of the blank and holds it against the blocks $d$ $d$ aforesaid. The retaining-arms $f$ are connected and secured to the upper ends of the vertical spindles $e$ by means of the clamping-cones $g$ and the screw-bolts $j$, which connection permits an angular adjustment to the arms $f$ in a horizontal plane. The spindles $e$ aforesaid pass vertically through bearings formed in the body of the plates B and B', and to the lower extremities of said spindles are securely attached the short levers $h$, the lower branch of each of which levers bear against the stationary horizontal ring-cam T, attached to the supports D of the bearings of the upright shafts R. Each upper branch of the aforesaid levers $h$ is provided with an opening which receives the lower extremities of prolongations of the helical springs $i$, said springs being supported by the standing studs $m$, secured to the under side of the plate B. The function of this spring is to cause the outer extremity of the lever $h$ to maintain a close contact with the internal circumference of the ring-cam T, the springs thus acting to maintain the extremity of the arms $f$ in contact with the blank, and the cam acting (through the medium of the lever $h$ and spindles $e$) to move the extremity of the arms $f$ away from the blanks. A blank, being established and held beneath the fingers of the adjustable blocks $d$, as hereinbefore described, is then divided at its middle point by the upper cutter, $k$, (which is held and adjusted in the cutter-arm U, Figs. 12 and 13,) acting in opposition to the cutting-block $a$, before described, contained in the chain G, said cutter-arm U being pivoted at the point $x$ and operated simultaneously with the levers K (whose motion will be hereinafter fully described) by means of the arms $n\,n$ of said levers. After the blank is divided the chain is moved forward and the plates rotated until another blank is brought under the cutter $k$ in the same manner as that already described, at which time each part of the blank previously divided occupies the position shown at $z'$, and by successive movements of the chain and plates the blanks finally arrive at the position $z^3$, Fig. 16, their large ends resting upon the lower dies, $p$, of the heading mechanisms, at which time the levers K (which are pivoted to the frame of the heading-presses at $x$) are made to descend by means of motion communicated to them from the shaft S, Figs. 5, 6, 7, and 8, through the medium of the eccentrics L L', the connecting-links J J', lever-arms H H', shafts E E', and the toggle-levers K' S' and K² S², or their equivalents, so that the upper die, $r$, which is carried in the enlarged moving extremity of the lever K aforesaid, comes in contact with the upper surface of the lower die, $p$, thus inclosing the enlarged end of the blank on three sides, the fourth and lower side resting on and being supported by the lower die, $p$, aforesaid. At this instant the heading-punch $d^2$, which is firmly held and accurately adjusted (by means to be hereinafter described) in the end of the sliding bar P, is moved toward the head of the blank by means of the revolving cam M on the shaft S, which action eventually results in giving the blank a head of the form and dimensions determined by the shape of the cavity in the upper die, $r$, combined with that in the end of the heading-punch $d^2$. At the completion of the operation of heading a blank the heading-punch $d^2$ is drawn away from said blank, (by the same means that moved it toward the blank originally,) and the upper die, $r$, is then raised from off the blank by the same mechanism which originally forced it down, after which the plates B and B' are turned through one-twelfth of a revolution, and an unheaded blank thereby brought into position on the lower die, $p$, and finally the headed blank is brought by a succession of movements of the plates into the position $z^6$, Fig. 16; but just previous to its arriving at this position the extremity of the arm $f$ is removed from its contact with the blanks $z^6$ by the action of the horizontal ring-cam T, hereinbefore mentioned, and upon the further movement of the dial the head of the blank comes in contact with a stationary pin at $d^3$, which causes the blank to escape from the control of the fingers and to drop from the plates a finished nail, as shown in Fig. 23.

Having described the operation of my improved mechanism, I will proceed to explain in detail the construction and methods of adjustment of its several parts, commencing with the upper cutter, $k$, and its holding mechanism, which I have illustrated in their simplest form in Figs. 8, 12, and 13, in which the cutter $k$ is represented as a cylindrical bar, (chisel-pointed at its lower extremity,) which is clamped vertically in the split end of the holder $k'$ by means of the screw-bolt $k^3$, said cutter being governed and secured in its vertical position by means of the screw-bolt $k^2$, the under side of whose head bears against the upper extremity of said cutter $k$. The holding-bar $k'$ aforesaid is held in place in the cutter-arm U by means of the nuts $t'\,t'$, acting on the clamps $t\,t$, and is adjusted sidewise by the two capstan-headed screws $t^2\,t^2$, which abut against opposite sides of said bar $k'$.

For the purpose of facilitating the operation, removal, and adjustment of the cutter $k$, I sometimes construct it in connection with the holding-bar $k'$ in the manner substantially as shown in Figs. 18, 19, 20, and 21 of Sheet XI, wherein the cutter $k$ is made of rectangular cross-section, and is fitted in a vertical groove formed in the end of the holding-bar $k'$, the upper end of said cutter $k$ being suspended to the plate W by means of the screw-pin W², said plate W being carried on the vertical adjusting-bolt $k^2$, between the head thereof and the collar $n^2$.

In order to relieve the adjusting-bolt $k^2$ of the transverse strain due to the work being performed, I have provided the plate W with the supporting-screw W³ at one of its ends, which screw may be secured by the jam-nut $m^3$ against accidental displacement after the plate W is adjusted vertically. By suspending the cutter in this manner its lower extremity is free to move in the direction of the length of the chain G, so as to automatically compensate for any slight irregularity in the spacing of the notches of said chain. This movement is accomplished by those sides of the cutter which are at right angles to the chain coming in contact with the beveled upper corners of the pentagonal blocks, which form the notches in the chain G, hereinbefore described.

For the purpose of preventing any useless or undue movement of the lower extremity of the cutter $k$ in the holder $k'$, I have provided a gib, $m^2$, which rests against one side of said cutter, said gib being acted upon by the wedge-block $l$, which block is operated by the nut $l'$, to regulate the freedom of movement of the cutter $k$ in the vertical groove aforesaid. By suspending the cutter by the screw-pin W² it may be readily removed for examination or repairs.

In order to facilitate the adjustment and removal of the upper holding-dies, $r$, of the heading-presses, the levers K, which carry said dies, are each provided at their moving ends with a vertical chamber, into which the die $r$ is placed, and a hook-headed wedge-shaped key, $r^2$, is inserted above it through a horizontal opening near the top of said lever, against the under side of which key rests the upper extremity of the die $r$ aforesaid.

Should it be desired to vary the vertical position of the die $r$ relative to its carrying-lever K, the wedge-shaped key $r^2$ aforesaid may be operated in the direction of its length for the purpose by the screw-adjusting devices $r^3$, which act upon the hook-head thereof.

For the purpose of adjusting the dies $r$ horizontally at right angles with the chain I have provided the capstan-headed screws $r^4$, which abut against the opposite sides of said die. After being properly adjusted in position by the devices hereinbefore described the dies $r$ are secured by means of the wedge-shaped blocks $r^6$, which are operated by the nuts $r^5$ or their equivalents.

The heading-punch $d^2$, Figs. 9 and 11, which is carried at the extremity of the horizontal heading-slide P, is for convenience of adjustment and removal placed between the parallel sides of the two adjusting-wedges $d^3$ and $d^4$, which are operated in the direction of the length of the sliding bar P by means of the capstan-headed screws $e'$ and $e^2$ so as to move the punch $d^2$ horizontally at right angles to the direction of its length. The extremity of the punch $d^2$ farthest removed from the plate B abuts against one extremity of the adjustable and removable bar $p^2$, said bar being dovetailed in a horizontal groove formed in the heading-slide P, in which groove it may be adjusted in the direction of its length by means of the capstan-headed screw $p^4$, which screw operates on the extremity of the bar $p^2$ to force it toward the punch $d^2$, and also to receive and resist the pressure communicated from the punch $d^2$ while the operation of heading a blank is being performed. The adjusting-screw $p^4$ aforesaid is tapped through the block $p^3$, said block being hinged to the heading-slide P at $p^5$, so that it may be turned back out of the line of movement of the dovetailed bar $p^2$, thus permitting said bar to be moved away from the rear end of the heading-punch $d^2$ a sufficient distance to admit of said punch being withdrawn in the same direction for examination or repair.

The description of one of these heading-presses will suffice for the other, as they are substantially duplicates.

It will be understood that I do not herein claim the movable pentagonal blocks $b\ b$ attached to the chain G, for the reason that this feature is embraced in a separate application of even date filed by myself and Thaddeus Fowler, administrator.

Having thus described the construction and operation of my invention, what I claim as new, and desire to secure by Letters Patent, is—

1. The combination of a notched chain for carrying metallic blanks, a mechanism for dividing or separating said blanks, and carrying disks or plates provided with holding-jaws for removing the blanks from the chain and conveying them to any point convenient for subsequent operations after they are divided, substantially as described.

2. The combination of a notched chain for conveying metallic blanks, a mechanism for dividing or separating the blanks, carrying disks or plates provided with holding-jaws for removing the divided blanks from the conveying-chain, and mechanism for heading the blanks, all substantially as described.

3. In combination with the notched chain for conveying metallic blanks, the carrying-plates, the movable and adjustable finger, and the two stationary fingers for the purpose of holding the axis of the blank in a radial direction as respects the plate while the blank is being conveyed, substantially as shown and described.

In testimony whereof I affix my signature in presence of two witnesses.

WILLIAM F. DURFEE.

Witnesses:
 ISAAC HOLDEN,
 GEORGE TERRY.